(12) United States Patent
Melnick et al.

(10) Patent No.: US 8,185,413 B2
(45) Date of Patent: May 22, 2012

(54) SYSTEM AND METHOD FOR BENEFIT PLAN COST ESTIMATION

(75) Inventors: Steve Melnick, St. Louis, MO (US);
Agnes Rey-Giraud, Clarkson Valley, MO (US)

(73) Assignee: Express Scripts, Inc., St. Louis, MO (US)

(*) Notice: Subject to any disclaimer, the term of this patent is extended or adjusted under 35 U.S.C. 154(b) by 494 days.

(21) Appl. No.: 11/646,670

(22) Filed: Dec. 28, 2006

(65) Prior Publication Data

US 2007/0106623 A1 May 10, 2007

Related U.S. Application Data

(63) Continuation of application No. 09/853,206, filed on May 11, 2011, now abandoned.

(51) Int. Cl.
*G06Q 40/00* (2006.01)

(52) U.S. Cl. .......................................................... 705/4

(58) Field of Classification Search ............... 705/400, 705/4

See application file for complete search history.

(56) References Cited

U.S. PATENT DOCUMENTS

| | | | |
|---|---|---|---|
| 5,191,522 A | 3/1993 | Bosco et al. | |
| 5,299,115 A | 3/1994 | Fields et al. | |
| 5,459,656 A | 10/1995 | Fields et al. | |
| 5,613,072 A | 3/1997 | Hammond et al. | |
| 5,655,085 A | 8/1997 | Ryan et al. | |
| 5,712,985 A | 1/1998 | Lee et al. | |
| 5,752,236 A | 5/1998 | Sexton et al. | |
| 5,855,005 A | 12/1998 | Schuler et al. | |
| 5,878,400 A | 3/1999 | Carter, III | |
| 5,884,274 A | 3/1999 | Walker et al. | |
| 5,913,198 A | 6/1999 | Banks | |
| 5,974,396 A | 10/1999 | Anderson et al. | |
| 6,009,402 A | 12/1999 | Whitworth | |
| 6,009,406 A | 12/1999 | Nick | |
| 6,009,407 A | 12/1999 | Garg | |
| 6,012,051 A | 1/2000 | Sammon, Jr. et al. | |
| 6,026,364 A | 2/2000 | Whitworth | |
| 6,032,125 A | 2/2000 | Ando | |
| 6,092,047 A | 7/2000 | Hyman | |
| 6,195,612 B1 | 2/2001 | Pack-Harris | |
| 6,456,979 B1 | 9/2002 | Flagg | |
| 6,735,569 B1 | 5/2004 | Wizig | |
| 7,376,574 B2 * | 5/2008 | Toan et al. ....................... 705/4 |
| 7,426,474 B2 * | 9/2008 | Schoenbaum et al. ............ 705/2 |
| 7,640,177 B2 | 12/2009 | Fralic | |

(Continued)

OTHER PUBLICATIONS

Joyce et al., Employer Drug Benefit Plans and Spending on Prescription Drugs, JAMA, Oct. 9, 2002, vol. 288, No. 14.*

(Continued)

*Primary Examiner* — Harish T Dass
*Assistant Examiner* — Clifford Madamba
(74) *Attorney, Agent, or Firm* — Bryan Cave LLP

(57) ABSTRACT

A computer-based method and system to enable a benefit plan sponsor to design a plurality of benefit plans to be offered to a given participant population and for determining the cost of sponsoring the plans for the participant population by predicting utilization for each of the plans based upon historical utilization data for the population, projected plan selections based upon presumed participant objectives, and/or survey or historical data from a sample of the given population or from preexisting statistical samples exhibiting analogous demographic characteristics to the given participant population relating to expected benefit utilization and plan preference criteria.

12 Claims, 6 Drawing Sheets

U.S. PATENT DOCUMENTS

| | | |
|---|---|---|
| 7,899,689 B1 | 3/2011 | Wizig |
| 7,912,734 B2 | 3/2011 | Kil |
| 7,912,739 B2 | 3/2011 | Colley |
| 2002/0049617 A1* | 4/2002 | Lencki et al. .................... 705/4 |
| 2002/0095316 A1 | 7/2002 | Toan et al. |
| 2002/0147617 A1 | 10/2002 | Schoenbaum et al. |

OTHER PUBLICATIONS

Gates et al., Modeling Consumer Health Plan Choice Behaviour to Improve Customer Value and Health Plan Market Share, J Business Res 2000; 48: 247-257.*

* cited by examiner

SYSTEM AND METHOD FOR BENEFIT PLAN COST ESTIMATION

RELATED APPLICATIONS

This application is a continuation of U.S. patent application Ser. No. 09/853,206, filed May 11, 2001, now abandoned, which parent application was and is hereby incorporated herein in its entirety for all purposes. All benefit under 35 U.S.C. §120 for and to that application was and is hereby claimed.

FIELD OF THE INVENTION

A computer-based method and system to enable the design of a plurality of benefit plans to be offered as a menu of alternative selections to a given participant population and for preferably determining the cost of sponsoring the menu of such plans for the participant population by preferably predicting utilization for each of the plans based upon, preferably, one or more of:

1) historical utilization data for the population, combined with projected plan selections based upon presumed participant objectives, such as, for example, cost minimization;

2) survey data from a sample of the given population relating to (a) expected benefit utilization and/or (b) plan preference criteria; and 3) survey and/or historical data from preexisting statistical samples exhibiting analogous demographic, medical or attitudinal characteristics to the given participant population regarding (a) benefit utilization and/or (b) plan preference criteria.

BACKGROUND OF THE INVENTION

Benefit plans which provide partial or complete reimbursement of expenditures incurred by participants in the plan are commonly offered by employers, associations, commercial entities and the like, which sponsor such plans as fringe benefits for employees or members or as a commercial service available to the general public. These benefit plans comprise a wide range of plan design options, including, for example, types of expenditures covered by the plan, limits on reimbursements to the participants and payments made by the participants for coverage by the plan. Potential sponsors of benefit plans are often constrained by cost limitations in determining the design options in the plan or plans the sponsor offers to its participants. Uncertainty in future cost expectations frustrates the efforts of sponsors to provide their participants the most desirable plan design options within given cost constraints. Because offering participants a choice between multiple plans having different plan design options exacerbates the resulting future cost uncertainty, sponsors are reluctant to undertake this approach, thus denying sponsors the ability to offer their participants access to a variety of benefit plans having plan design options most closely tailored to the participant's needs.

SUMMARY OF THE INVENTION

The present invention provides a new and unique process for, among other things, preferably developing a plurality (menu) of proposed benefit plans, and, according to the plan design options within each plan, to determine the expected utilization of each of the plans by the given participant population. Using the expected utilization data derived from the unique process, the present invention also preferably allows the sponsor to determine the resultant total cost to the sponsor of offering the array of plans in the menu. Through initial plan development and successive iterations of 1) cost determination, 2) cost evaluation, and 3) plan design option modification, a plan menu offering maximum plan flexibility for participants at an optimum cost to the sponsor is achieved. The modification of plan design options to attain the sponsor's predetermined target cost can be accomplished selectively by the user, or alternatively, may be conducted automatically and repetitively, as necessary, according to a predetermined methodology embodied in a computer processing function.

The present invention can also be used by a participant or prospective participant to select and/or modify plan design options and their associated values in order to design a benefit plan specifically tailored for the individual participant. By using historical or other utilization data input by the user, the present invention also preferably allows the participant or prospective participant to determine the cost of participating in one or more plans in a menu. Through successive iterations of 1) cost determination, 2) cost evaluation, and 3) plan design option modification, a plan offering desired plan design options at an acceptable cost can be accomplished selectively by the user. Alternatively, this process may be conducted automatically and repetitively, as necessary, according to a predetermined methodology embodied in a computer processing function.

The present invention can preferably be utilized in applications wherein contingent benefits are offered to participants as part of a plan which is underwritten (funded) by a sponsor, to provide medical, health, dental, vision, prescription drug and other products and services. The invention may also preferably be used for insurance benefits covering life, casualty, liability and pet health care losses. The invention may preferably be used to compile a menu of plans with a projected sponsorship cost approximating a target outlay of funds the sponsor has budgeted for an associated participant population, such as the amount an employer may budget as a fringe benefit provided to its employees. A sponsor's objectives may include, for example, meeting a fixed budget amount for total benefits expenditures, achieving a target average cost per participant, or meeting a target cost sharing ratio, such as the sponsor paying 80% of costs of participants' prescription drugs, with the remaining 20% of costs borne by participants. Alternatively, by allowing manipulation of plan design options to create plans which generate payments by the participants in excess of the sponsor's costs, such as periodic fixed contributions paid to the sponsor by plan participants and/or per transaction copayments paid by the participant, the invention can be used to fashion a menu which an entrepreneurial sponsor may offer to a predetermined market segment with an expectation of generating a profit for the sponsor.

The present invention can also be used by a participant or prospective participant to estimate the cost of participating in one or more plans having given plan design option values. Using this cost estimation information, a participant or prospective participant may select and/or modify plan design options and their associated values in order to create a benefit plan specifically tailored for the individual participant, preferably to obtain a plan having a predetermined target cost to the participant.

Broadly, in one aspect, the present invention concerns a method for using a computer apparatus which has 1) an input device for receiving input data, 2) a memory device connected to the input device for storing the input data, 3) a processor connected to the memory device which is programmed to perform operations upon stored data to produce output data, and 4) an output device connected to the processor for displaying the output data, for evaluating a menu of plans, from which participants (consumers) select and under each plan a provider (sponsor) supplies each selecting consumer's utilization quantity of products and payments are made by the consumer, such that the provider's estimated cost is equal to a predetermined target cost, comprising:

inputting proposed values corresponding to each plan design option in each plan;

inputting the unit cost of supplying each product;

estimating the utilization quantity of each product for each consumer;

predicting the plan selected by each consumer;

calculating the estimated cost by accumulating the costs of supplying each consumer under the consumer's selected plan, whereby the cost of supplying each consumer is the sum of the unit cost of each product multiplied by the consumer's estimated utilization quantity of that product, less the payments made by the consumer;

and outputting the estimated cost.

Broadly, in another aspect, the present invention concerns a computer based system for determining the values corresponding to each plan design option of a plurality of plans, from which a plurality of consumers may each select and under each of which plans a provider supplies each selecting consumer's utilization quantity of one or more products, such that the estimated cost to the provider of supplying the products approximates a predetermined target cost, comprising:

an input device for receiving input data, including data representing proposed initial values corresponding to each plan design option in each plan and the unit cost of supplying each product;

a memory device connected to the input device for storing the input data, a processor connected to the memory device which is programmed to perform operations upon stored data, including estimating the utilization quantity of each product for each consumer, predicting the plan selected by each consumer, and calculating the estimated cost of supplying each consumer under the consumer's selected plan by accumulating the unit cost of each product multiplied by the consumer's estimated utilization quantity of that product and subtracting any payments made by the consumer, to produce output data;

an output device connected to the processor for displaying the output data;

and means for adjusting the plan design option values according to the difference between the target cost and the estimated cost.

Broadly, in another aspect, the present invention concerns a method for using a computer apparatus for evaluating one or more plans under which a provider supplies the consumer's utilization quantity of one or more products comprising:

inputting values corresponding to each plan design option in each plan;

estimating the utilization quantity of each product for the consumer;

calculating the cost to the consumer for each plan by accumulating the transactional cost to the consumer for each product plus any periodic payments made by the consumer; and outputting the calculated cost.

Other advantages, features, and aspects of the present invention are discussed below.

BRIEF DESCRIPTION OF THE DRAWINGS

A full and enabling disclosure of the present invention, including the presently preferred mode thereof, to one of ordinary skill in the art, is set forth more particularly in the remainder of the specification, including reference to the accompanying drawings, in which.

Figure 1:
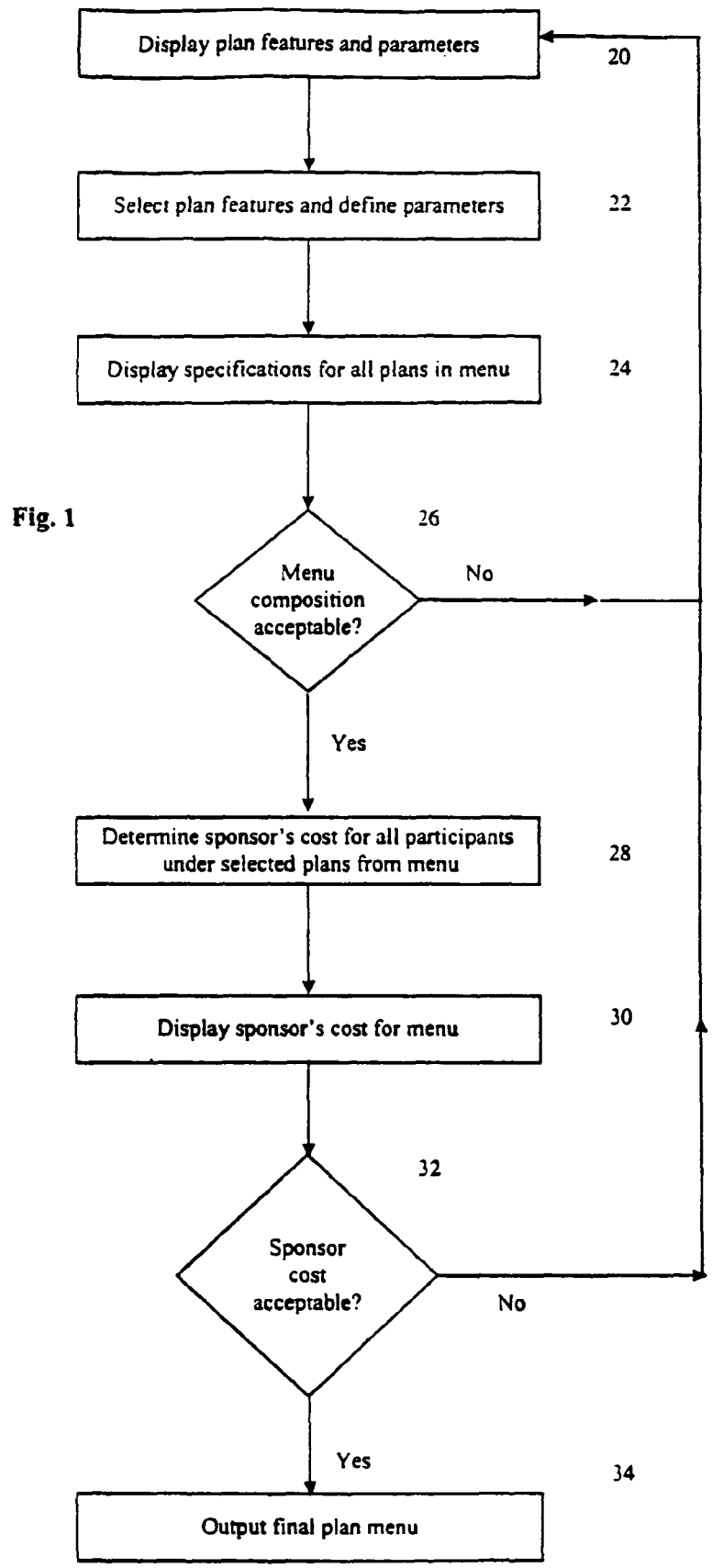
FIG. 1 is a flow chart of the method of the present invention.

The drawings are provided for illustrative purposes only and should not be used to unduly limit the scope of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Although the present invention is described herein within the context of the preferred embodiment relating to the development and evaluation of prescription drug benefit plans, it will be recognized by those skilled in the art that the invention is not limited to prescription drug plans but, rather, the present invention is applicable to any types of benefit and insurance plans, such as medical, health, dental, vision, pharmaceutical and other benefit and insurance plans covering life, casualty, liability and pet health care expenditures.

The present invention is preferably implemented with a computer apparatus which has 1) an input device for receiving input data, 2) a memory device connected to the input device for storing the input data, 3) a processor connected to the memory device which is programmed to perform operations upon stored data to produce output data, and 4) an output device connected to the processor for displaying the output data. The operation of the preferred embodiment of the invention commences with the sponsor's development of a plan menu by selecting from a predetermined option set of one or more plans having predetermined plan design options or from open plan formats offering the sponsor the ability to select one or more plan design options and to establish numerical parameters associated with the plan design options, such as maximum benefit coverage levels. The fixed feature plan option set of a preferred embodiment of the present invention may comprise a finite number of plans, each having unique predetermined plan design options and associated benefit levels. For example, a prescription drug benefit plan may comprise plan design options and associated benefit levels which preferably include: periodic (monthly) fixed contribution payment amount, periodic deductible amount, transactional copayment amount, coinsurance payment percentage, stop loss limitation, benefit cap limitation, prescription drug formulary coverage, prescription drug rebate applicability, retail network availability, mail service option, and generic prescription drug coverage. As known in the field of benefit plan development, these terms are defined below:

monthly fixed contribution payment—a monthly fee paid by the participant periodic deductible—an expenditure level below which the cost of the covered prescription drugs is borne by the participant (in some plans, until the deductible amount is met, the participant is extended the benefit of purchasing covered prescription drugs at the same price as paid by the sponsor)

transactional copayment—the amount paid by the participant in the purchase of a given prescription drug coinsurance payment percentage—the proportional amount of the cost of a given prescription drug paid by the participant stop-loss—a limitation on the out-of-pocket expenses for the participant, above which level the plan sponsor bears all costs benefit cap—a benefit maximum, limiting the amount the plan will provide to a participant or the participant and covered dependents, such that the participant bears all costs above the plan's cap prescription drug formulary coverage—plan benefits which apply to specific predetermined prescription drugs for the treatment of a given condition prescription drug rebate applicability—rebates which apply to purchases of specific prescription drugs retail network availability—plan benefits which apply to purchases made at retail pharmacies mail service option—plan benefits which apply to purchases of prescription drugs delivered by mail from predetermined pharmacy suppliers generic prescription drug coverage—plan benefits which apply to purchases of generic prescription drugs Additionally or alternatively, the open plan template of a preferred embodiment of the present invention may comprise provisions for the sponsor to incorporate various plan design options, and, if applicable, to establish associated numerical parameters for the plan design options, such as monthly fixed contribution payment amount, periodic deductible amount, coinsurance payment percentage and transactional copayment amount.

The input process for plan design of a preferred embodiment of the present invention may be accomplished by a potential sponsor, participant or other user through a variety of input devices including, for example, keyboard, keypad, graphical user interface ("GUI"), Internet access, e-mail, voice recognition program, telephone, cellular telephone, pager, PDA, or other voice or data input device, including, for example, scanning information from a source document. The output data and plan menu development options of a preferred embodiment of the present invention may be conveyed to the potential sponsor or participant through a variety of output device media including, for example, computer monitor, GUI, Internet, e-mail, CDROM, cellular telephone display, PDA display, printout, facsimile, or other method of image, data or document transmission. Security measures may be implemented as necessary to ensure confidentiality of data, for example, data relating to plan design options, participant identity and medical history.

In a preferred embodiment of the present invention, once the sponsor's proposed plan design options comprising its plan menu have been defined, they are preferably assembled by the processor into a proposed plan design. Upon completion, each proposed plan design is preferably presented to the sponsor for review and modification, if desired. Once the sponsor is satisfied with the proposed plan design, the sponsor may approve the plan design for inclusion in the proposed plan menu. This process of plan development of a preferred embodiment of the present invention is continued until the sponsor has developed a desired number of plan designs to comprise the proposed plan menu of a preferred embodiment of the present invention. Once the sponsor approves the composition of its proposed plan menu, the cost analysis process is initiated by the processor.

The cost analysis process of a preferred embodiment of the present invention involves 1) the determination of each individual participant's preference of plan from the sponsor's proposed plan menu (or election not to participate in plans offered by the sponsor) and 2) the calculation of the aggregate cost to the sponsor of each participant's projected prescription drug utilization under that participant's preferred plan.

In a preferred embodiment of the present invention, the initial step in the cost analysis process, the determination of the individual participant's preference of plan from the sponsor's proposed plan menu, can be based upon the presumed objective of minimizing costs to the participant. Using this approach, the plan option offering the lowest cost to the participant for the participant's projected prescription drug utilization is predicted as the participant's selected plan. Of course, additional or alternative participant criteria, including, for example, a preference for a plan offering specific plan design options, such as, network availability or formulary availability, may be used to predict plan selection.

Additionally, survey data obtained from each individual participant, or from a statistical sample of the given participant population relating to plan preference from the selections available in the sponsor's proposed plan menu may be used to predict plan selection. Alternatively, the individual participant's preference within the sponsor's proposed plan menu may be inferred from survey data of the individual participant or a statistical sample of the given population reflecting general plan preference criteria or from selections made from a hypothetical plan menu. Similarly, the individual participant's preference within the sponsor's proposed plan menu may be inferred from data reflecting historical plan selection decisions made by the given participant population.

Further, plan selection can be predicted by evaluation of the selection preferences of a population segment having demographic, medical or attitudinal characteristics from plan menus comprising alternatives with plan design options identical or similar to those in the sponsor's proposed plan menu. Similarity between this analogous population segment and the participant population can be determined on the basis of demographic, medical or attitudinal characteristics, including age, gender, family size, income, occupation, residence characteristics, lifestyle and prescription drug usage.

Once a preferred plan has been identified for each participant in a preferred embodiment of the present invention, each participant's projected prescription drug utilization quantity under that respective participant's preferred plan can preferably be used to derive the sponsor's cost for covering that participant. The invention can accurately determine projected prescription drug utilization by employing, for example, historical utilization data from the given participant population or from analogous population samples having similar demographic, medical or attitudinal characteristics. In making these projections, the participant's utilization of prescription drugs may be assumed to be invariable over time. For plans in which the benefits to the participants may extend to spouses and/or dependents, the projected utilization may encompass all prescription drugs used by the participant and all others covered on behalf of the participant. If desired, adjustments to expected utilization can be made for expected future utilization variations based upon user surveys that may inquire into relevant factors such as, for example, increased or decreased family size or changes in medical conditions requiring prescription drug treatments. Additionally, if appropriate, adjustments to expected utilization can be made to reflect a predicted plan menu selection which will result in increased or decreased participant costs for historically utilized prescription drugs in circumstances where future utilization is expected to vary with respect to the portion of the cost of the prescription drug borne by the participant. Also, if desired, adjustments to projected prescription drug costs can be made to reflect trends which will result in increased or decreased future costs to participants and/or sponsors, such as aging of participants, medical advancements and availability of generic equivalents.

Once the cost for each participant's participation in the program has been determined in a preferred embodiment of the present invention, these costs can be preferably aggregated to arrive at the sponsor's cost for providing the plans to all participants. At this point, the projected sponsor's cost can preferably be displayed and/or provided to the sponsor or other user through the output device. If desired, changes to the proposed plan menu can be implemented by the user through the input device to obtain a projected cost more consistent with the sponsor's objectives, and the cost analysis process can be repeated to verify the expected cost of the modified proposed plan menu. Alternatively, the means for adjusting the values may comprise a computer processor step for automatically adjusting the values that correspond to the plan design options according to the difference between the target cost and the calculated estimated cost, such that the estimated cost approaches or equals the target cost.

FIG. 1 is a flow chart illustrating the method of one embodiment of the present invention. In Step 20 the available plan design options and associated numerical parameters are displayed for the potential sponsor. These plan design options may include copay/drug formulary criteria, network accessibility, mail service, deductible amount, rebate qualification, administrative fees and fixed contribution amount. In Step 22, the potential sponsor designs the plan by providing inputs through the input device to select from among the plan design options and, where applicable, establishing the associated parameters incorporated in a plan to be offered as a selection within the plan menu. Once the potential sponsor has designed the desired number of plans sufficient to complete the menu, the specifications for each plan are output by the output device for review and approval or modification by the sponsor (Step 24).

Upon review of the plan design options, if further modifications are desired, the sponsor has the option in Step 26 to return to Steps 20 and 22 to alter the plan design options of one or more of the plans. Alternatively, if the plans are deemed acceptable, the sponsor may process the plan menu through the cost analysis function in Step 28. Two alternative approaches to this cost analysis function (Step 28) are further detailed in FIGS. 2 and 3. Upon completion of the cost analysis function (Step 28), the resulting sponsor cost is displayed for the sponsor (Step 30). If the sponsor cost is deemed unsatisfactory by the sponsor (Step 32), one or more of the plans comprising the menu can be revised (Steps 20 and 22) for further cost analysis (Step 28). Alternatively, if the sponsor cost is deemed acceptable (Step 32), the plan menu can be finalized (Step 34) for transmission to the participant population for evaluation and acceptance.

Figure 2:
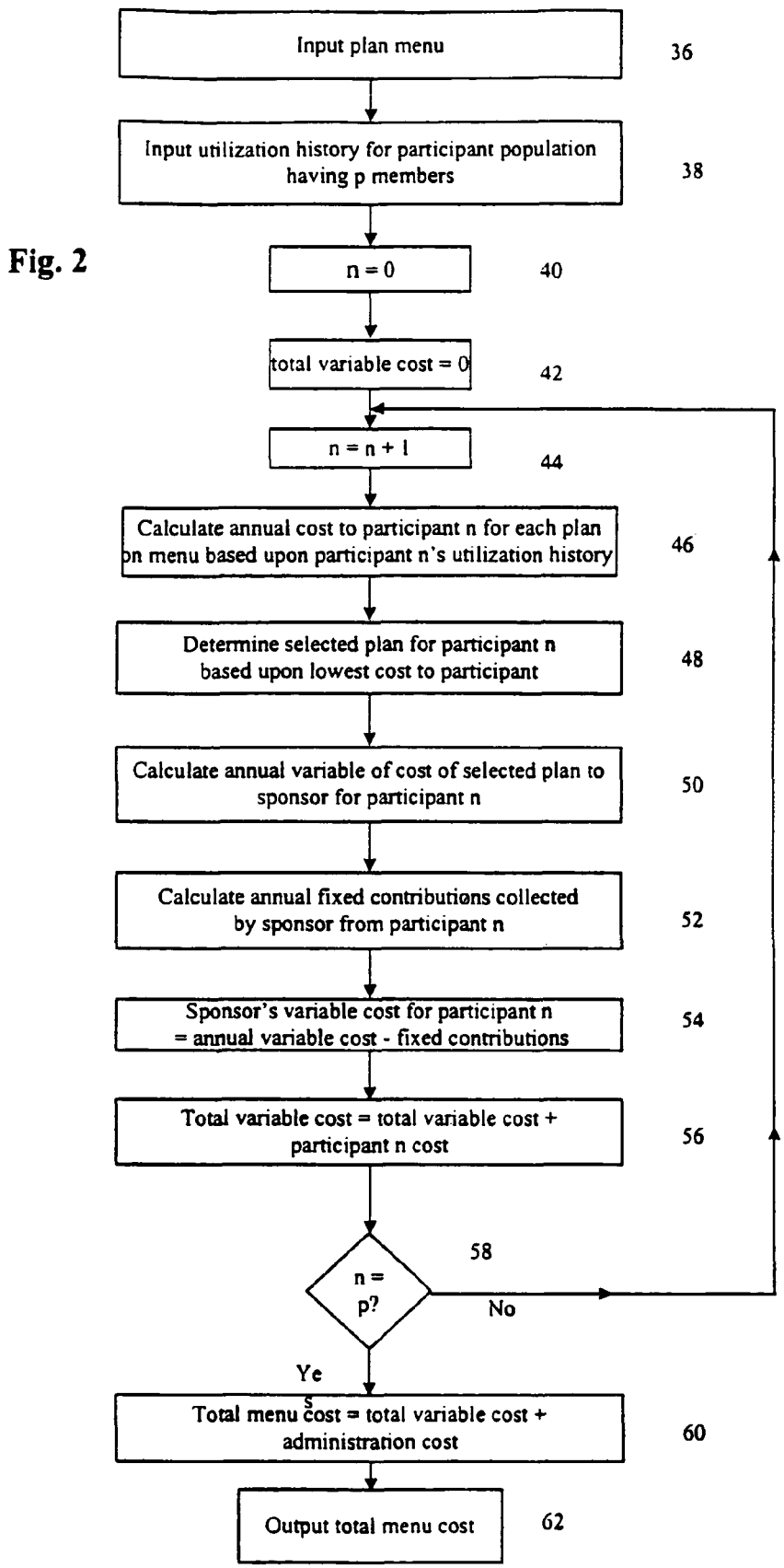
FIG. 2 is a flow chart illustration of the cost analysis function of the present invention based upon minimizing the cost of participation for each participant.

FIG. 2 is a flow chart illustration of one approach for performing the cost analysis function of the present invention based upon minimizing the total cost to each participant of purchasing prescription drugs. This approach assumes that each participant will select the plan from the menu which offers the lowest cost to the participant for satisfying the participant's historical prescription drug utilization requirements. As illustrated in FIG. 2, the proposed plan menu is input into the cost analysis function (Step 36). Next, in Step 38, the utilization history for the participant population having a total number of p members is input. In Step 40 the value of n, the participant reference number, is initialized at zero and in Step 42, the value of "total variable cost" is initialized to zero. In Step 44 the participant reference number is incremented by one and in Step 46 the annual cost to participant reference number n for participating in each plan offered on the plan menu is calculated based upon data representing participant n's historical utilization of types and quantities of prescription drug products. The participants' utilization histories of prescription drug products may be obtained from records of prescription utilization under previous benefit plans or through data obtained from the individual participants in response to survey questions. This cost determination process (Step 46) is described in greater detail in FIG. 5.

In Step 48 the plan option having the lowest cost to the participant is predicted as the plan selection for participant n based upon the presumed objective of the participant of minimizing costs. Next, in Step 50 the annual variable cost to the plan sponsor for participant n's participation in the selected plan is calculated. This cost determination process (Step 50) is described in greater detail in FIG. 4. In Step 52 the amount of annual fixed contributions collected by the sponsor from participant n for participation in the selected plan is calculated. In Step 54 this amount of fixed contributions collected is subtracted from the annual variable cost to the participant to determine the sponsor's variable cost for participant n.

In Step 56, the total net cost to the sponsor for each successive individual participant within the given participant population is accumulated. At Step 58 the cost determination function is reinitiated for each member in the participant population, until completion of the variable cost computations for all p participants. At Step 60, the total variable cost for all members of the participant population to the sponsor is added to the administration cost for the given plan menu to determine the total cost of offering the plan menu. In Step 62, the total menu cost is output through the output device.

Another approach to predicting participant choices involves categorizing the participant population into segments according to demographic, medical or attitudinal characteristics. Demographic characteristics include, for example, age, gender, family size, income, occupation, residence characteristics and lifestyle. Medical characteristics relate to physical conditions and disorders, such as alcohol, tobacco or drug use, genetic disposition for medical disorders, occupational environment and prescription drug usage. Attitudinal characteristics relate to health care preferences and attitudes towards health care management preferences, such as whether the participant strictly relies upon advice of health care professionals, or whether the participant prefers to independently research and decide individual health care issues.

Once the participant population segments are defined, samples from each segment can be tested for specific preferences among predetermined plan menu choices and/or for more general preferences for plan design options, such as indicated by sensitivity analyses or trade-off analyses, from which responses to specific plan choices may be extrapolated. The results of this analysis of each segment's plan menu preferences may be expressed in a plan selection probability distribution for that segment.

By correlating each of the p members within the participant population to the most appropriate segment and then to the corresponding plan selection distribution for that segment, a predicted plan selection can be determined for each participant. By computing and summing the cost of sponsoring the predicted plan for each participant based upon that participant's historical prescription drug utilization, the sponsor's cost for the entire participant population can be determined. The sponsor's total cost may be expressed as a probability distribution curve, a numerical range with statistical confidence levels, or in other statistical formats.

As an alternative to individual historical utilization data, samples from each segment can be surveyed to determine a probability distribution of prescription drug utilization for each member of that segment, from which the sponsor's cost for participants within the segment may be determined.

Figure 3:
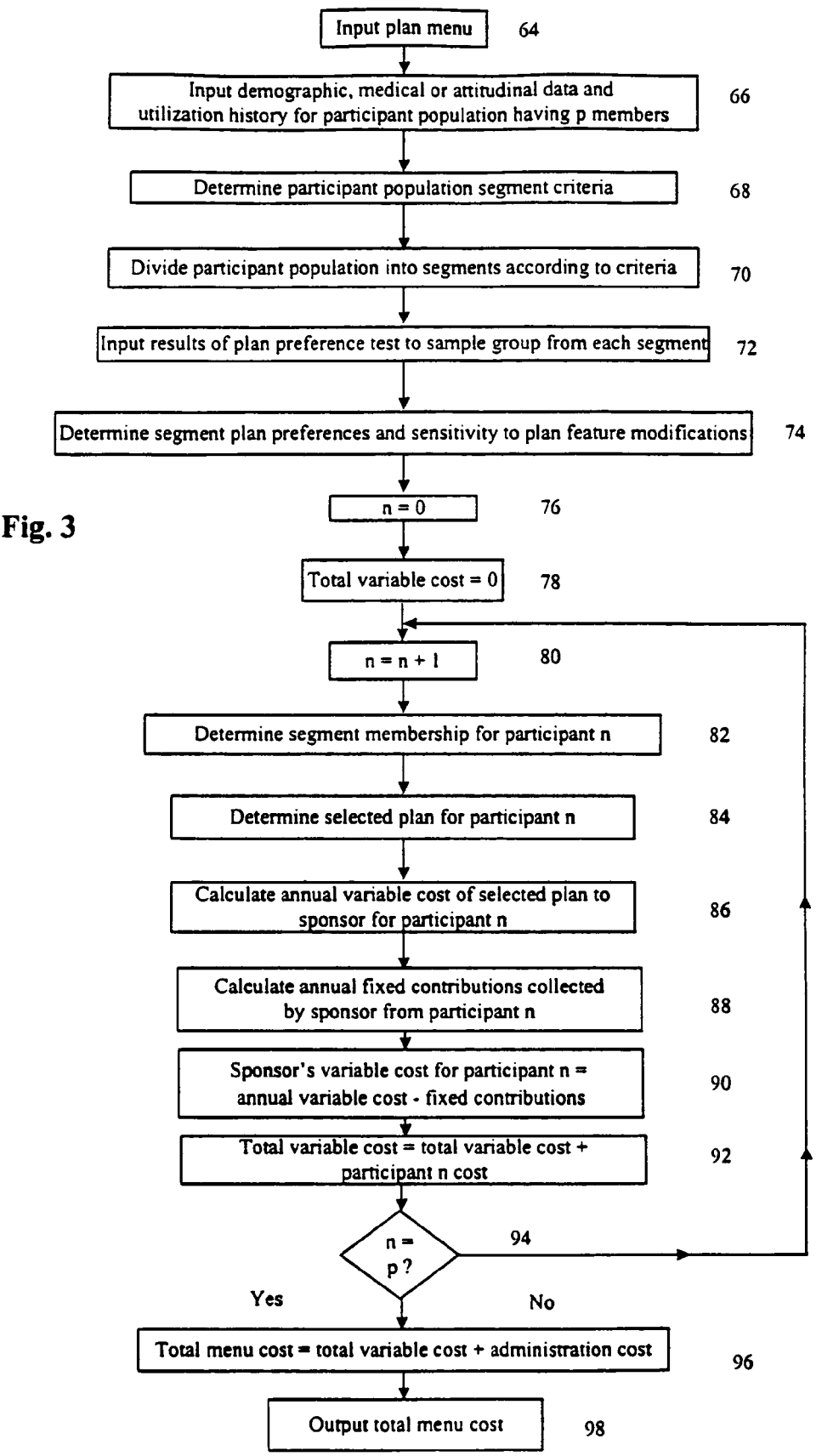
FIG. 3 is a flow chart illustration of the cost analysis function of the present invention based upon population segmentation.

As illustrated in FIG. 3, this population segmentation cost determination model commences with Step 64 input of the plan menu. At Step 66 demographic, medical and/or attitudinal characteristic data and the utilization history data for the participant population are input using the input device. In Step 68 the demographic, medical and/or attitudinal characteristic data for the population is analyzed to determine criteria by which the population may be divided into segments comprised of participants with similar prescription drug use characteristics. In Step 70 the participant population is divided into segments according to the criteria identified in Step 68. Next, in Step 72 sample groups from each participant population segment are surveyed for determination of benefit plan preferences which may be attributed to the entire population segment and data reflecting these preferences are input. This sampling procedure can be accomplished using a variety of media, including Internet, e-mail, automated telephone survey with voice recognition capability, questionnaire forms and telephone or personal interviews. Using the data obtained in this process, in Step 74 preferences in each population segment for particular plan design options are inferred, along with a determination of the segment's sensitivity to hypothetical modifications of the plan design options. As in Steps 46 through 62 of the cost minimization demand model depicted in FIG. 2, Steps 82 through 98 involve the calculation of the total cost to the sponsor for providing the menu to each of the P members of the participant population. In Step 82 the individual participant n is identified as having common characteristics with a population segment and attributed plan selection objectives, upon which a plan selection from the menu for participant n can be predicted in Step 84. Steps 86 through 98 of FIG. 3 involve the same operations as Steps 50 through 62, respectively, of FIG. 2.

Figure 4:
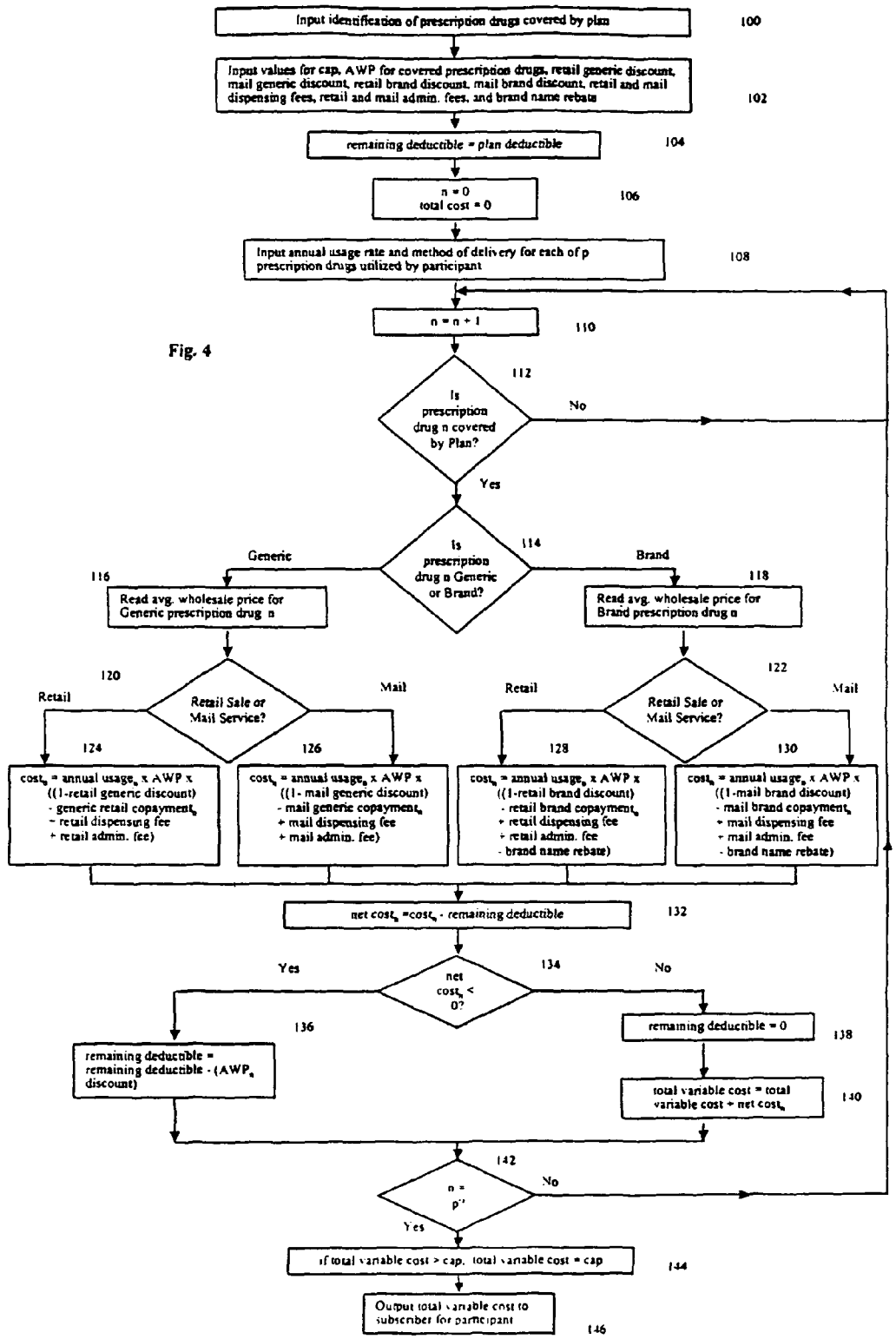
FIG. 4 is a flow chart illustration of the calculation of the annual variable cost to the sponsor of participation in a selected plan for a given participant.

FIG. 4 illustrates in greater detail the flowchart for the calculation of the annual variable cost of the selected plan for a given individual participant based upon the predicted plan selection for that participant (Step 86 of FIG. 3). As illustrated in FIG. 4 this computation begins with the input of the identification of the prescription drugs which are covered by the predicted plan selection in Step 100. Next, values for the average wholesale price for the covered prescription drugs, along with values for the retail generic discount, mail generic discount, retail brand discount, mail brand discount, retail and mail dispensing fees, retail and mail administration fees and brand name rebate are input in Step 102. In Step 104 the "remaining deductible" variable is initialized at the value for the required deductible amount for the selected plan. In Step 106 the values for the index number n of the particular prescription drug used by the participant and for the variable which accumulates the total cost to the sponsor for this participant's participation in the given plan are set at zero. In Step 108 each of the p prescription drugs utilized by the given participant are identified, along with the annual usage quantity of the prescription drug and the historical method of delivery utilized by the participant for the particular prescription drug.

In Step 110 the value of the participant's prescription drug number n is incremented by one. At Step 112 prescription drug n is compared against the list of prescription drugs carried by the plan, and if not covered, no cost is incurred by the sponsor, and hence processing of the next prescription drug on the participant's usage list is commenced at Step 110. Alternatively, if the given prescription drug n is covered by the plan, the processing proceeds through the decision tree at Step 114 to the appropriate alternate branch for generic prescription drugs or brand name prescription drugs commencing at Steps 116 or 118, respectively. In Steps 116 and 118 the average wholesale price for the prescription drug n is determined from the input values. Next, corresponding decision trees at Steps 120 or 122 direct the processing to appropriate program branches for computation of prescription drug costs for retail sale or mail delivery. These decision trees direct the processing through the applicable subroutine in Steps 124, 126, 128 and 130, which correspond to the prescription drug cost computation subroutines for retail sale of a generic prescription drug, mail delivery of a generic prescription drug, retail sale of a brand name prescription drug and mail delivery of a brand name prescription drug, respectively. In each case, $Cost_n$, the annual costs of providing the prescription drug n to the participant, is determined by multiplying the annual usage quantity of the prescription drug by the average wholesale price for the prescription drug as adjusted by appropriate values for the applicable type of discount and the addition of the per transaction dispensing and administration fees.

In Steps 132 through 140 the effect of the participant's remaining deductible upon the sponsor's cost of the prescription drug is evaluated. In Step 132 the net cost of the prescription drug n to the sponsor is calculated by subtracting the participant's remaining deductible from the previously computed cost of the prescription drug. In Step 134, if the cost of the prescription drug n was less than the participant's remaining deductible, then the entire cost of prescription drug n is borne by the participant. In this case the remaining deductible value is decremented by the amount paid by the participant for prescription drug n in Step 136 and the sponsor's total cost remains unchanged. In this exemplar benefit plan, if the participant has not satisfied the plan's deductible amount, the participant is extended the benefit of purchasing the covered prescription drug at the same price, average wholesale price less appropriate discount plus the per transaction dispensing and administration fees, as paid by the sponsor. Alternatively, if the cost of the prescription drug exceeds the remaining deductible, such that the participant's entire deductible requirement has been satisfied, the value for the remaining deductible is set to zero in Step 138, and in Step 140 the sponsor's total variable cost accumulator variable is increased by the net cost of prescription drug n, that is cost n less any remaining deductible which was satisfied by the participant in the purchase of prescription drug n. Next, in Step 142, if the currently processed prescription drug n was not the final prescription p on the participant's utilization list, the cost calculation processing is repeated commencing from Step 110. Alternatively, if the processed prescription drug was the final prescription drug on the participant's list, thus having the index number of p, the processing proceeds to Step 144 where the total variable cost to the sponsor of the participant's prescription drug purchases is compared to the plan cap amount. As is know by those skilled in the art, the cap is an upper limit on the annual costs to the sponsor for an individual participant. Accordingly, if the calculated total variable cost exceeds the cap, its value is reduced to the cap amount. In Step 146 the total variable cost for the participant is output.

Figure 5:
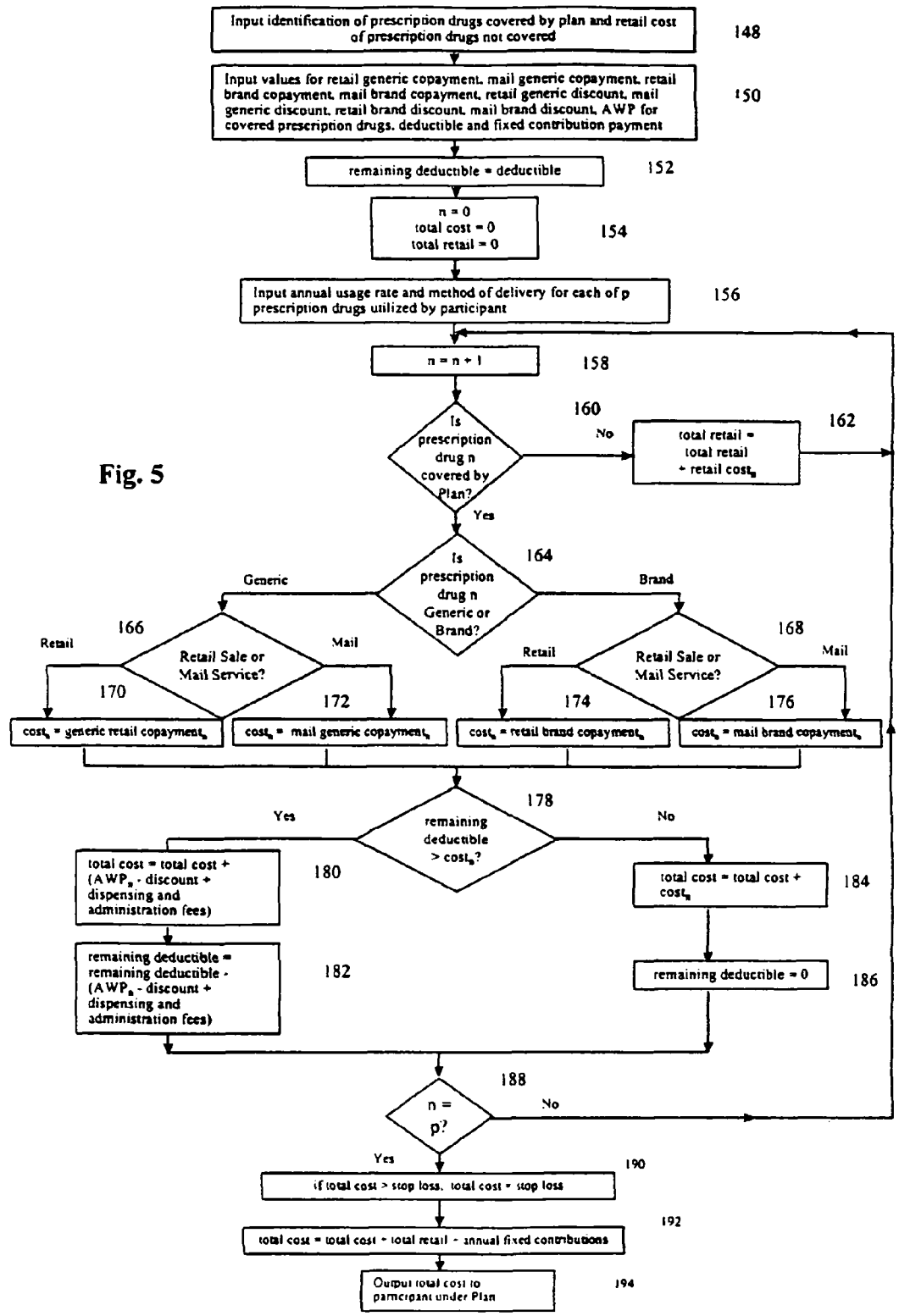
FIG. 5 is a flow chart illustration of the calculation of the annual cost to a participant for participation in a plan based upon the participant's utilization history.

FIG. 5 illustrates in greater detail the processing steps depicted in Step 46 of FIG. 2 for the calculation of the annual cost to the participant for each alternative plan choice on the available menu, based upon that participant's utilization history. As outlined in FIG. 5, the processing commences at Step 148 with the input of the identification of prescription drugs covered by the particular plan under consideration and the retail cost to participants of prescription drugs not covered. In Step 150, the values of the plan for the deductible amount, the retail generic copayment, the mail generic copayment, the retail prescription drug brand copayment, the mail brand prescription drug copayment, along with values for the retail generic discount, mail generic discount, retail brand discount, mail brand discount and the participant's fixed contribution payment amounts are input. In Step 152 the variable corresponding to the participant's remaining (unsatisfied) deductible amount is initialized at the amount of the annual deductible required by the plan under consideration. Next, in Step 154 the index number of the prescription drug under consideration, n, is initialized at zero, along with the variables corresponding to the total cost to the participant for each of the p prescription drugs utilized (total cost) and the total retail cost to the participant for prescription drugs not covered by the plan (total retail). In Step 156 data reflecting the identification of each of the p prescription drugs utilized by the participant, along with the annual usage quantity and the method of delivery for each such prescription drug, are input.

In Step 158 the value of the participant's prescription drug index number under consideration, n, is incremented by one. At Step 160 prescription drug n is compared against the list of prescription drugs covered by the plan. If prescription drug n is not covered, the participant must pay for n, and accordingly, in Step 162 the total retail cost paid by the participant is increased by the retail cost of n. Following Step 162, processing of the next prescription drug on the participant's usage list is commenced at Step 158. Alternatively, if the given prescription drug n is covered by the plan, the processing proceeds through the decision tree at Step 164 to the appropriate alternate branch for generic prescription drugs or brand name prescription drugs commencing at Step 166 or 168, respectively. In Steps 166 and 168, corresponding decision trees direct the processing through the applicable subroutine in Steps 170, 172, 174 and 176, which correspond to determinations of the copayment amount ($cost_n$) paid by the participant for each of 1) retail sale of a generic prescription drug, 2) mail delivery of a generic prescription drug, 3) retail sale of a brand name prescription drug, and 4) mail delivery of a brand name prescription drug, respectively.

Once the participant's copayment for the prescription drug purchase is determined based upon its classification as a generic or a name brand prescription drug and as a retail sale or by mail delivery in Step 178, this copayment amount is compared to the remaining deductible required to be paid by the participant to trigger the payment of benefits under the plan. If the copayment amount is less than the participant's remaining deductible (Step 178), such that the participant would be responsible for the total cost of the prescription drug, the program proceeds to Step 180 wherein the participant's total cost register variable is incremented by the amount of the prescription drug cost to the participant. In this exemplar benefit plan, if the participant has not satisfied the plan's deductible amount, the participant is extended the benefit of purchasing the covered prescription drug at the average wholesale price less appropriate discount plus the per transaction dispensing and administration fees, the same price as would be paid by the sponsor.

Subsequently in Step 182, the remaining deductible amount is decremented by the amount paid by the participant for the prescription drug. Alternatively, if the copayment amount is greater than or equal to the remaining deductible (Step 178), then the total cost register is incremented by the remaining deductible in Step 184, and the remaining deductible register is set at zero in Step 186. At Step 188 if the index number of the prescription drug under consideration is not equal to p, the index number of the last prescription drug on the participant's usage list, then the processing continues at Step 158 to consider the next prescription drug on the participant's list. Conversely, if the index number of the prescription drug for which computation has just completed is equal to p, the last number on the participant's prescription drug list, the processing proceeds to Step 190 wherein the total cost to this participant is compared to the stop-loss amount of the plan, if applicable. As is know by those skilled in the art, stop loss is a feature of some benefit plans which provides an upper limit of out-of-pocket expenses for the participant. Thus, if the participant's cost has reached the maximum expenditure level, beyond which the plan sponsor bears all costs, the total cost is maximized at the stop loss amount.

At Step 192, the total cost is incremented by the amount of annual fixed contributions required to be paid under the plan under consideration. At the completion of the process in Step 194, the total cost to the participant under the given plan is output.

The process outlined in FIG. 5 can also be used by a participant or prospective participant to estimate the cost of participating in one or more plans having given plan design option values. Using information provided by this cost estimation feature, a participant or prospective participant may select and/or modify plan design options and their associated values in order to design a benefit plan specifically tailored for the individual participant. This process of modifying plan design option values to obtain a plan having a predetermined target cost to the participant also may be conducted automatically through a computer processing function.

Figure 6:
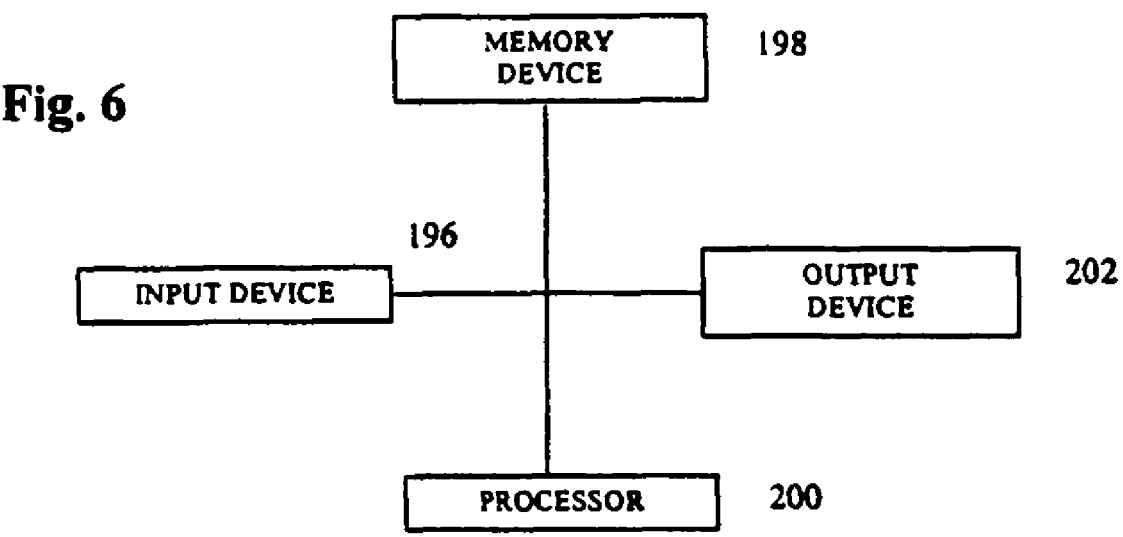
FIG. 6 is an illustration of the system of the present invention.

FIG. 6 is an illustration of the system of one embodiment of the present invention. In FIG. 6, the computer apparatus comprises an input device 196 for receiving input data, a memory device 198 connected to the input device 196 for storing the input data, a processor 200 connected to the memory device 198, which is programmed to perform operations upon stored data to produce output data, and 4) an output device 202 connected to the processor 200 for displaying the output data.

While preferred embodiments of the invention and preferred methods of practicing the same have been shown and described herein, persons of ordinary skill in the art will recognize and appreciate that the invention encompasses and includes numerous modifications and variations thereto without departing from the spirit and scope of the present invention. In addition, it should be understood, and persons of ordinary skill in the art will recognize, that aspects of the various preferred embodiments discussed herein may be interchanged or eliminated both in whole or in part. Furthermore, those of ordinary skill in the art will appreciate the foregoing description is by way of example only, and does not and is not intended to limit the scope, nature and/or variations of the invention.

What is claimed is:

1. A method comprising:

receiving, on a computer processor, a sponsor selection of a first plurality of plan design options associated with a first prescription drug benefit plan;

receiving, on the computer processor, the sponsor selection of a second plurality of plan design options associated with a second prescription drug benefit plan, the first plurality of design options being different than the second plurality of plan design options;

assembling, on the computer processor, the first plurality of plan design options into a first proposed design plan;

assembling, on the computer processor, the second plurality of plan design options into a second proposed design plan, the second plurality of plan design options being different than the first plurality of plan design options;

receiving, on the computer processor, sponsor approval for composition of a proposed plan menu, the proposed plan menu including the first proposed design plan and the second proposed design plan, the proposed plan menu being associated with a plan sponsor, the plan sponsor being associated with a plurality of plan members;

accessing, on the computer processor, past prescription drug utilization associated with at least some of the plurality of plan members, the past prescription drug utilization including identification and quantity of a plurality of prescription drugs used by a particular plan member of the at least some of the plurality of plan members;

accessing, on the computer processor, user survey information regarding relevant factors associated with the past prescription drug utilization;

accessing, on the computer processor, drug utilization trend information reflecting expected changes to prescription drug cost which includes aging of participants, medical advancements, and availability of generic equivalents;

projecting, on the computer processor, for each of the plurality of plan members a projected prescription drug utilization based on the past prescription drug utilization, the user survey information, and the drug utilization trend information;

accessing, on the computer processor, a statistical sample taken from the plurality of plan members of a plan preference of the first proposed design plan or the second proposed design plan;

accessing, on the computer processor, historical plan selection decision data associated with at least a portion of the plurality of plan members;

accessing, on the computer processor, selection preference data associated with a population segment having a similar grouping characteristic to the plurality of plan members, the population segment including a plurality of persons that are not among the plurality of plan members, the similar grouping characteristic reflecting a shared commonality among the plurality of plan members;

determining, on the computer processor, for each of the plurality of plan members a perceived plan preference of the first proposed design plan or the second proposed design plan based on a presumed member objective to minimize member cost, the statistical sample taken of the plan preference, the historical plan selection decision data, and the selection preference data associated with the population segment having the similar grouping characteristic;

determining, on the computer processor, an estimated sponsor cost for participation of each of the plurality of plan members in either the first proposed design plan or the second proposed design plan based on a determination of the perceived plan preference;

aggregating, on the computer processor, the estimated sponsor cost for the plurality of plan members to calculate a total estimated sponsor cost for the participation of each of the plurality of plan members in either the first proposed design plan or the second proposed design plan;

accessing, on the computer processor, a total sponsor target cost for the plurality of plan members to participate in either the first proposed design plan or the second proposed design plan;

determining, on the computer processor, a difference between the total estimated sponsor cost and the total sponsor target cost;

automatically adjusting, on the computer processor, the first plurality of plan design options associated with the first prescription drug benefit plan and the second plurality of plan design options associated with the second prescription drug benefit plan based on the difference based on a determination of the difference;

assembling, on the computer processor, the adjusted first plurality of plan design options into a first adjusted proposed design plan;

assembling, on the computer processor, the second adjusted plurality of plan design options into a second adjusted proposed design plan, the second adjusted plurality of plan design options being different than the first adjusted plurality of plan design options;

determining, on the computer processor, for each of the plurality of plan members a perceived plan preference of the first adjusted proposed design plan or the second adjusted proposed design plan based on the presumed member objective to minimize member cost, the statistical sample taken of the plan preference, the historical plan selection decision data, and the selection preference data associated with the population segment having the similar grouping characteristic;

determining, on the computer processor, an adjusted estimated sponsor cost for participation of each of the plurality of plan members in either the first adjusted proposed design plan or the second adjusted proposed design plan based on a determination of the perceived plan preference; and aggregating, on the computer processor, the adjusted estimated sponsor cost for the plurality of plan members to calculate a total adjusted estimated sponsor cost for the participation of each of the plurality of plan members in either the first adjusted proposed design plan or the second adjusted proposed design plan.

2. The method of claim 1, wherein accessing the statistical sample comprises:

segmenting the plurality of plan members based on a plurality of grouping characteristics to create a plurality of segments, a particular segment of the plurality of segments associated with a particular grouping characteristic of the plurality of grouping characteristics and including a portion of the plurality of plan members; and sampling each of the plurality of segments of the plan preference of the first proposed design plan or the second proposed design plan to create the statistical sample.

3. The method of claim 2, wherein sampling comprises:
sampling each of the plurality of segments of the plan preference of the first proposed design plan or the second proposed design plan by sensitivity analysis to create the statistical sample.

4. The method of claim 1, wherein sampling comprises:
sampling each of the plurality of segments of the plan preference of the first proposed design plan or the second proposed design plan by trade off analysis to create the statistical sample.

5. The method of claim 1, wherein the grouping characteristic includes a demographic characteristic.

6. The method of claim 1, wherein the grouping characteristic includes an attitudinal characteristic.

7. The method of claim 1, wherein the grouping characteristic includes a medical characteristic.

8. The method of claim 1, wherein the first plurality of plan design options include a periodic fixed contribution payment amount, a periodic deductible amount, a transactional copayment amount, a coinsurance payment percentage, a stop loss limitation, a benefit cap limitation, a prescription drug formulary coverage, a prescription drug rebate applicability, a retail network availability, a mail service option, and a generic prescription drug coverage.

9. The method of claim 1, wherein the first plurality of plan design options include a periodic fixed contribution payment amount, a periodic deductible amount, a transactional copayment amount, a coinsurance payment percentage, a stop loss limitation, a benefit cap limitation, a prescription drug formulary coverage, a prescription drug rebate applicability, a retail network availability, a mail service option, a generic prescription drug coverage, and combinations thereof.

10. A non-transitory computer readable medium comprising instructions, which when implemented by one or more processors perform the following operations:
receive a sponsor selection of a first plurality of plan design options associated with a first prescription drug benefit plan;
receive the sponsor selection of a second plurality of plan design options associated with a second prescription drug benefit plan, the first plurality of design options being different than the second plurality of plan design options;
assemble the first plurality of plan design options into a first proposed design plan;
assemble the second plurality of plan design options into a second proposed design plan, the second plurality of plan design options being different than the first plurality of plan design options;
receive sponsor approval for composition of a proposed plan menu, the proposed plan menu including the first proposed design plan and the second proposed design plan, the proposed plan menu being associated with a plan sponsor, the plan sponsor being associated with a plurality of plan members;
access past prescription drug utilization associated with at least some of the plurality of plan members, the past prescription drug utilization including identification and quantity of a plurality of prescription drugs used by a particular plan member of the at least some of the plurality of plan members;
access user survey information regarding relevant factors associated with the past prescription drug utilization;
access drug utilization trend information reflecting expected changes to prescription drug cost which includes aging of participants, medical advancements, and availability of generic equivalents;
project for each of the plurality of plan members a projected prescription drug utilization based on the past prescription drug utilization, the user survey information, and the drug utilization trend information;
access a statistical sample taken from the plurality of plan members of a plan preference of the first proposed design plan or the second proposed design plan;
access historical plan selection decision data associated with at least a portion of the plurality of plan members;
access selection preference data associated with a population segment having a similar grouping characteristic to the plurality of plan members, the population segment including a plurality of persons that are not among the plurality of plan members, the similar grouping characteristic reflecting a shared commonality among the plurality of plan members;
determine for each of the plurality of plan members a perceived plan preference of the first proposed design plan or the second proposed design plan based on a presumed member objective to minimize member cost, the statistical sample taken of the plan preference, the historical plan selection decision data, and the selection preference data associated with the population segment having the similar grouping characteristic;
determine an estimated sponsor cost for participation of each of the plurality of plan members in either the first proposed design plan or the second proposed design plan based on a determination of the perceived plan preference;
aggregate the estimated sponsor cost for the plurality of plan members to calculate a total estimated sponsor cost for the participation of each of the plurality of plan members in either the first proposed design plan or the second proposed design plan;
access a total sponsor target cost for the plurality of plan members to participate in either the first proposed design plan or the second proposed design plan;
determine a difference between the total estimated sponsor cost and the total sponsor target cost;
automatically adjust the first plurality of plan design options associated with the first prescription drug benefit plan and the second plurality of plan design options associated with the second prescription drug benefit plan based on the difference based on a determination of the difference;
assemble the adjusted first plurality of plan design options into a first adjusted proposed design plan;
assemble the second adjusted plurality of plan design options into a second adjusted proposed design plan, the second adjusted plurality of plan design options being different than the first adjusted plurality of plan design options;
determine for each of the plurality of plan members a perceived plan preference of the first adjusted proposed design plan or the second adjusted proposed design plan based on the presumed member objective to minimize member cost, the statistical sample taken of the plan preference, the historical plan selection decision data, and the selection preference data associated with the population segment having the similar grouping characteristic;
determine an adjusted estimated sponsor cost for participation of each of the plurality of plan members in either the first adjusted proposed design plan or the second adjusted proposed design plan based on a determination of the perceived plan preference; and aggregate the adjusted estimated sponsor cost for the plurality of plan members to calculate a total adjusted estimated sponsor cost for the participation of each of the plurality of plan members in either the first adjusted proposed design plan or the second adjusted proposed design plan.

11. The method of claim 1, wherein the projected drug utilization of the particular plan member is different than the past prescription drug utilization of the particular plan member.

12. The method of claim 1, wherein the projected drug utilization of the particular plan member includes a generic version of a drug included in the past prescription drug utilization of the particular plan member.

* * * * *